(12) United States Patent
Lees et al.

(10) Patent No.: US 10,902,541 B2
(45) Date of Patent: Jan. 26, 2021

(54) WATERMARKING A DIGITAL IMAGE

(71) Applicant: International Business Machines Corporation, Armonk, NY (US)

(72) Inventors: Andrew Lees, Wimborne (GB); Aaron T. R. Gashi, Eastleigh (GB); Aaron Collins, Exmouth (GB); Samuel Hawker, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/167,720

(22) Filed: Oct. 23, 2018

(65) Prior Publication Data

US 2020/0126176 A1   Apr. 23, 2020

(51) Int. Cl.
*G06T 1/00* (2006.01)
*G06K 9/20* (2006.01)

(52) U.S. Cl.
CPC .......... *G06T 1/0028* (2013.01); *G06K 9/2054* (2013.01); *G06K 2209/01* (2013.01)

(58) Field of Classification Search
CPC ............................ G06T 1/0028; G06K 9/2054
See application file for complete search history.

(56) References Cited

U.S. PATENT DOCUMENTS

| | | | |
|---|---|---|---|
| 6,064,764 A | 5/2000 | Bhaskaran et al. | |
| 6,278,792 B1 | 8/2001 | Cox et al. | |
| 6,614,914 B1* | 9/2003 | Rhoads | B42D 25/00 382/100 |
| 7,084,903 B2 | 8/2006 | Narayanaswami et al. | |
| 7,697,717 B2 | 4/2010 | Mayboroda et al. | |
| 8,175,322 B2 | 5/2012 | Tian et al. | |
| 8,660,295 B2 | 2/2014 | Seshadri et al. | |
| 2007/0177759 A1* | 8/2007 | Eschbach | G06T 1/0028 382/100 |

FOREIGN PATENT DOCUMENTS

| | | |
|---|---|---|
| CN | 102096894 B | 10/2012 |
| CN | 103886536 A | 6/2014 |

OTHER PUBLICATIONS

Unknown, "Watermark Photos Quickly: 100 in 1 Minute", Visual Watermark, 13 pages, printed Sep. 10, 2018 https://www.visualwatermark.com/.
Wikipedia, "Outline of object recognition", From Wikipedia, the free encyclopedia, 10 pages, last edited on Jul. 11, 2018, printed Sep. 10, 2018 https://en.wikipedia.org/wiki/Outline_of_object_recognition.
Huynh-The et al., "A Novel Watermarking Scheme for Image Authentication in Social Networks", Proceedings of the 9th International Conference on Ubiquitous Information Management and Communication, Article No. 48, 8 pages, Jan. 8-10, 2015.
Microsoft, "GetSystemMetrics function", Microsoft Docs, 18 pages, Aug. 16, 2018 https://msdn.microsoft.com/en-us/library/windows/desktop/ms724385(v=vs.85).aspx.

* cited by examiner

*Primary Examiner* — Tuan H Nguyen
(74) *Attorney, Agent, or Firm* — Nathan M. Rau (57) ABSTRACT

A digital image can be watermarked by a computer-implemented method. An image analysis process can be performed on the digital image to identify an area of the digital image containing at least one predetermined object. Watermark information representative of content of the identified area can be generated, and a digital watermark containing the generated watermark information can be subsequently watermarked/overlaid onto the digital image.

16 Claims, 7 Drawing Sheets

WATERMARKING A DIGITAL IMAGE

BACKGROUND

The present disclosure relates generally to the field of marking data, and in particular to a method for watermarking a digital image. Embodiments of the present disclosure can include a system and/or a computer program product comprising computer-readable program code that enables a processor of a system to implement such a method.

Watermarking of digital images can be used to prevent or dissuade copying of a digital image by an unauthorized person. A digital image can be watermarked by overlaying the digital image with a digital watermark containing watermark information, also known as a "watermark overlay."

The watermark information contained in a digital watermark can indicate an originating source of the digital image, e.g., by identifying an owner of the digital image. A typical digital watermark is visible to a viewer of the digital image, so that the viewer is presented with the watermark information. This can help dissuade the unauthorized person from copying the digital image and/or ensures that ownership of a digital image can be established.

SUMMARY

Embodiments may be directed towards a computer-implemented method for watermarking a digital image. The method can include performing, on the digital image, an image analysis process to identify an area of the digital image containing at least one predetermined object. The method can also include generating watermark information representative of content of the identified area and applying, to the digital image, a digital watermark containing the generated watermark information.

Embodiments may also be directed towards a computer program product for watermarking a digital image. The computer program product can include a computer-readable storage medium having program instructions embodied therewith, wherein the computer-readable storage medium is not a transitory signal, per se. The program instructions can be executable by a computer to cause the computer to perform a method. The method can include performing, on the digital image, an image analysis process to identify an area of the digital image containing at least one predetermined object. The method can also include generating watermark information representative of content of the identified area and applying, to the digital image, a digital watermark containing the generated watermark information.

Embodiments may also be directed towards a system for watermarking a digital image. The system can include at least one processor circuit, and a memory electrically coupled to the at least one processor circuit. The system can include a set of computer program instructions stored in the memory and executed by the at least one processor circuit in order to perform a method. The method can include performing, on the digital image, an image analysis process to identify an area of the digital image containing at least one predetermined object. The method can also include generating watermark information representative of content of the identified area and applying, to the digital image, a digital watermark containing the generated watermark information.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

In the drawings and the Detailed Description, like numbers generally refer to like components, parts, steps, and processes.

DETAILED DESCRIPTION

It should be understood that the Figures are merely schematic in nature, and are not necessarily drawn to scale. It can also be understood that the same reference numerals are used throughout the Figures to indicate the same or similar parts.

In the context of the present disclosure, where embodiments of the present disclosure constitute a method, it should be understood that such a method may be a process for execution by a computer, i.e., it may be a computer-implementable method. The various operations of the method may therefore reflect various parts of a computer program, e.g., various parts of one or more algorithms or sections of computer-executable instructions. Also, in the context of the present application, a system may include a single device or a collection of distributed devices that are adapted and interconnected to execute one or more embodiments of the methods of the present disclosure. For example, a system can be a personal computer (PC), a server or a collection of PCs and/or servers connected via a network such as a local area network, the Internet, and so on. Such a system can be used to cooperatively execute at least one embodiment of the methods of the present disclosure.

Embodiments can be used to watermark a digital image so that the watermarked digital image provides information on the content of an area of the digital image containing an object. Thus, information relating to an object contained in the digital image can be watermarked onto the digital image.

Embodiments are at least partially based on the realization that there is a desire to avoid or discourage editing of images, and in particular, objects within an image that are susceptible to editing. Editing of images, and in particular of objects in an image, can, in some instances, be used to mislead future viewers of the edited image regarding the original content of the digital image. The process of watermarking the image based on, or representing content of, an area containing an object can be useful in reducing the likelihood that unauthorized editing of the object in the image will go unnoticed by a subsequent viewer.

Embodiments of the present disclosure can be useful to identify an area containing an object and watermark the image with information about the content of the area. Accordingly, there is described a computer-implemented method for watermarking a digital image. The described method includes performing an image analysis process on the digital image to identify an area of the digital image containing at least one predetermined object. The method also includes generating watermark information representative of the content of the identified area. The method further includes applying a digital watermark to the digital image, where the applied digital watermark contains the generated watermark information.

The present disclosure describes a concept for automated watermarking of a digital image so that the watermarked digital image provides information on the content of an area of the digital image containing an object. Thus, information relating to an object contained in the digital image is thereby watermarked onto the digital image.

The process of digitally watermarking an image with information relating to an object, i.e., the watermark information, can make any subsequent alterations or modifications to the object, such as a copy of the digital image, more easily recognized or identified. Thus, digital watermarking can help reduce the likelihood that unauthorized modifications to an object contained in the digital image will go unnoticed by a viewer of such a modified image.

Watermarking a digital image in this way can be useful in preventing undesired editing of an object contained in an image, and can enable any modifications to the object to be readily identified. This can, for example, enable counterfeit images to be identified, thereby reducing a chance of misleading viewers as to an image's true or original content. In particular, watermarking a digital image with information about the area containing an object increases a difficulty of modifying the object in the digital image without such modifications being readily noticeable.

In some embodiments, the image analysis process includes an object detection process adapted to identify at least one predetermined object contained in the digital image. Identifying an area of the digital image can include identifying a location of at least one predetermined object contained in the digital image. Thus, the area for which watermark information, of the contents thereof, is generated may be a predetermined object identified in the digital image. In some embodiments, generating watermark information can include generating watermark information based on the at least one identified or predetermined object. Thus, the watermark information may directly represent an object identified in the digital image.

In some embodiments, applying a digital watermark to the digital image includes superimposing a visible watermark on the digital image. For example, a digital watermark may be superimposed onto the original image so that it is visible or perceptible to a viewer of the watermarked image. Thus, applying a digital watermark to the digital image may include superimposing watermark information on the digital image, so that the digital watermark is visible/perceptible as overlaid onto the original image.

Such application of the watermark can reduce the likelihood that an object in a watermarked image will be edited by an unauthorized user, as such a user will be able to immediately identify that information for the object that has been watermarked onto the image. This can result in the unauthorized user being dissuaded from editing the image, as they would recognize that any modifications could be readily identified by other parties.

The visible watermark can be a human-understandable watermark, such as text or other symbols/images that can be interpreted and understood by a viewer of the watermarked image.

In some embodiments, the at least one predetermined object can include an object displaying cognitive information, so that the image analysis process can be adapted to identify an area of the digital image containing at least one object displaying cognitive information. Cognitive information can be considered to be any information requiring interpretation by a human viewer to understand the content of the information. This may, for example, include any object displaying text, symbols and/or images for conveying ideas, beliefs or representations of objects/concepts. Example of objects displaying cognitive information include signs, placards, posters, flags, e.g., electronic, billboards, advertisements, logos, text, labels, paintings, screens and/or visual displays.

In some embodiments, the object displaying cognitive information can be an aesthetic creation, i.e., something created for subjective appreciation or understanding. In particular, an aesthetic creation may convey cognitive information to a viewer of the image, e.g., in the form of text or artistic works. Thus, the identified object may be any human/machine-designed source of cognitive information for a human viewer. An object displaying cognitive information, such as an aesthetic creation, in a digital image can be distinguishable from non-cognitive information displaying objects, such as a tree or an animal.

Objects displaying cognitive information are particularly susceptible to being altered by unauthorized parties, e.g., to mislead viewers of the image as to cognitive information provided by an originator of an image. Thus, by providing a digital watermark that relates to such objects, the likelihood that an image will undergo unauthorized modifications can be reduced.

In some embodiments, the at least one predetermined object includes text, and thus the image analysis process can be adapted to identify an area of the digital image containing text. Text of an image can be highly vulnerable to modification, due to the relative ease of modifying text, for example using standard image manipulation programs, relative to other objects/parts of an image. Thus, by digitally watermarking an image to contain information relating to the text, a likelihood of the image being manipulated or altered by unauthorized parties can be reduced.

In some embodiments, generating watermark information includes performing an optical character recognition process on the identified area of the digital image containing text to obtain machine-encoded text and generating watermark information containing machine-encoded text. Thus, embodiments can be useful for watermarking a digital image containing text with a digital watermark containing the same text. This can result in the digital image being watermarked with the same text displayed in the digital image. The optical character recognition process may include generating a character string based on text contained in the identified area of the digital image as the watermark information. This character string is subsequently used to generate a digital watermark.

By watermarking the digital image with this generated text, a viewer of a copy of the image can immediately identify the original text included within the image. This identification can help to ensure that modifications to the text can be readily and quickly discerned. In particular, if text of an image is modified, then the modified text can be readily compared to the original text contained in the watermark to establish whether the original text in the image has been modified. This identification can help to reduce the risk that modifications to the image will go unnoticed.

According to embodiments, applying the digital watermark may include superimposing the machine-encoded text on the digital image. The computer-implemented method can further include identifying typeface characteristics of the identified text, wherein generating watermark information includes generating a digital watermark including the machine-encoded text having the same identified typeface characteristics as the identified text.

Typeface characteristics can include information related to a font family e.g., font style, sloping, width, kerning, spacing, weight, size, decoration, e.g., underlines or strikethroughs, capitalization, and so on. In other words, the visible digital watermark may replicate a font style of any text contained within the digital image. This can result in the digital watermark more closely matching the original text of the digital image, which can further dissuade unauthorized persons from modifying the watermarked image.

In some embodiments, the visible digital watermark may be created in a different font style than the text contained in the digital image. This font style difference can increase the difficulty of modifying text contained in a watermarked image, as more than one text of different styles, i.e., the watermark and the original text of the image, would need to be modified in order to manipulate the image.

In some embodiments, the at least one predetermined object can include signage, so that the image analysis process can be adapted to identify an area of the image containing signage. Signage, e.g., that is formed from one or more signs, can be a common form of conveying information to a person and typically has well defined boundaries, e.g., a road sign or a placard. Thus, signage can also be highly vulnerable to modification by an unauthorized person in order to trick or mislead people as to a sign's original intended communication. By providing a digital watermark associated with the signage, it can be possible to verify whether signage has been modified by an unauthorized person, so that information conveyed by the amended signage is not accurate or does not represent the true or original intention of the signage.

In embodiments, generating watermark information can include performing a signage processing operation on the identified area of the digital image containing signage in order to identify cognitive information provided by the signage and generating watermark information including the cognitive information provided by the signage. By watermarking a digital image with cognitive information provided by signage, the original content of the signage can be represented on the image, thereby leading to a reduced likelihood that editing of the signage, e.g., by an unauthorized or unscrupulous user, will go unnoticed by a subsequent viewer of the edited image.

Figure 1:
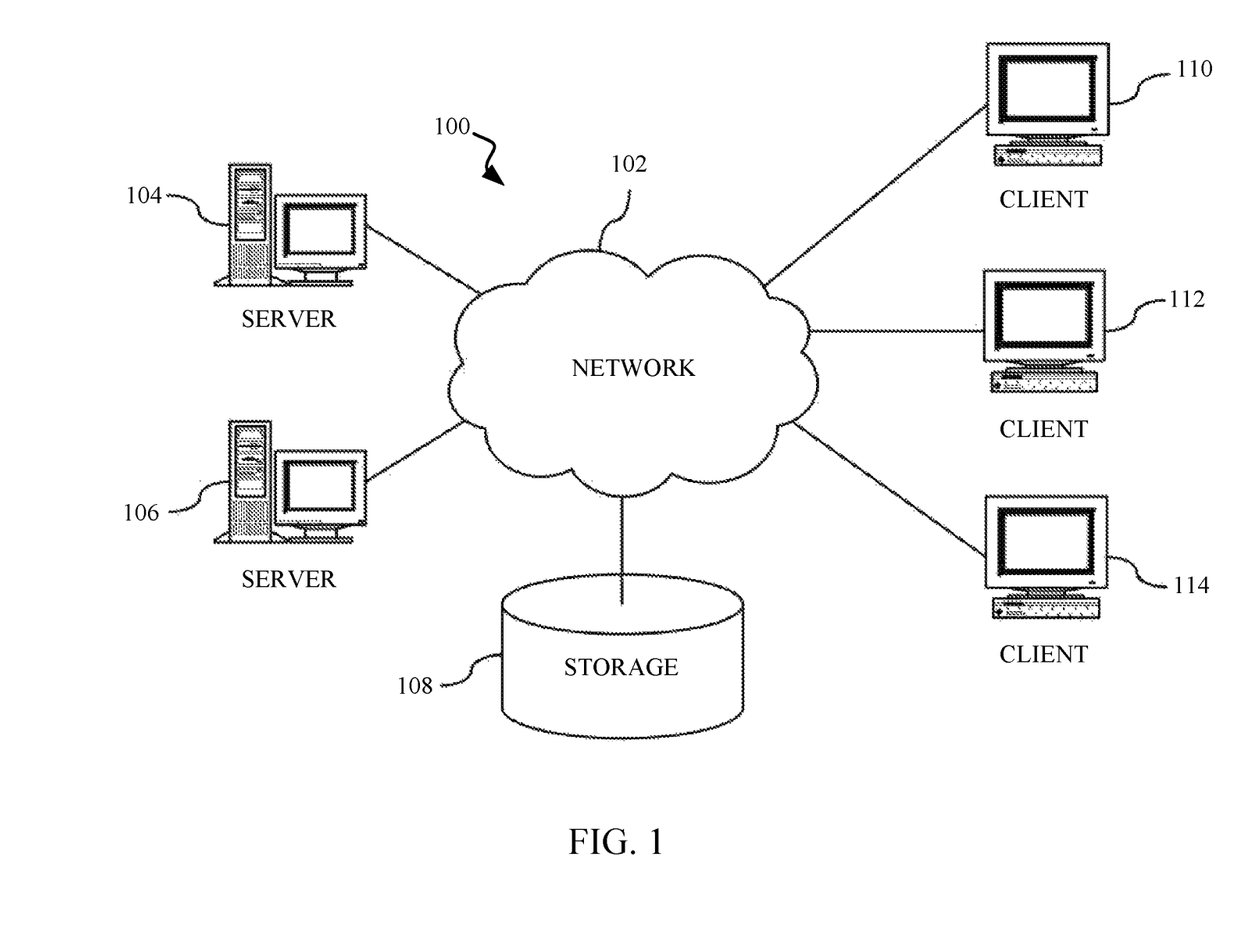
FIG. 1 depicts an example distributed system, according to embodiments of the present disclosure.

FIG. 1 depicts an example distributed system in which aspects of the embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 server are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 can provide data, such as boot files, operating system images, and applications to the clients 110, 112, and 114. Clients 110, 112, and 114 are clients to the first server 104 in the depicted example. The distributed data processing system 100 may include additional servers, clients, and other devices not shown.

In the depicted example, the distributed data processing system 100 can include the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. The distributed data processing system 100 can also be implemented to include a number of different types of networks, such as for example, an intranet, a local area network (LAN), a wide area network (WAN), or the like. As stated above, FIG. 1 is intended as a non-limiting example, not as an architectural limitation for different embodiments of the present disclosure, and therefore, the particular elements shown in FIG. 1 should not be considered limiting with regard to the environments in which the illustrative embodiments of the present disclosure may be implemented.

Figure 2:
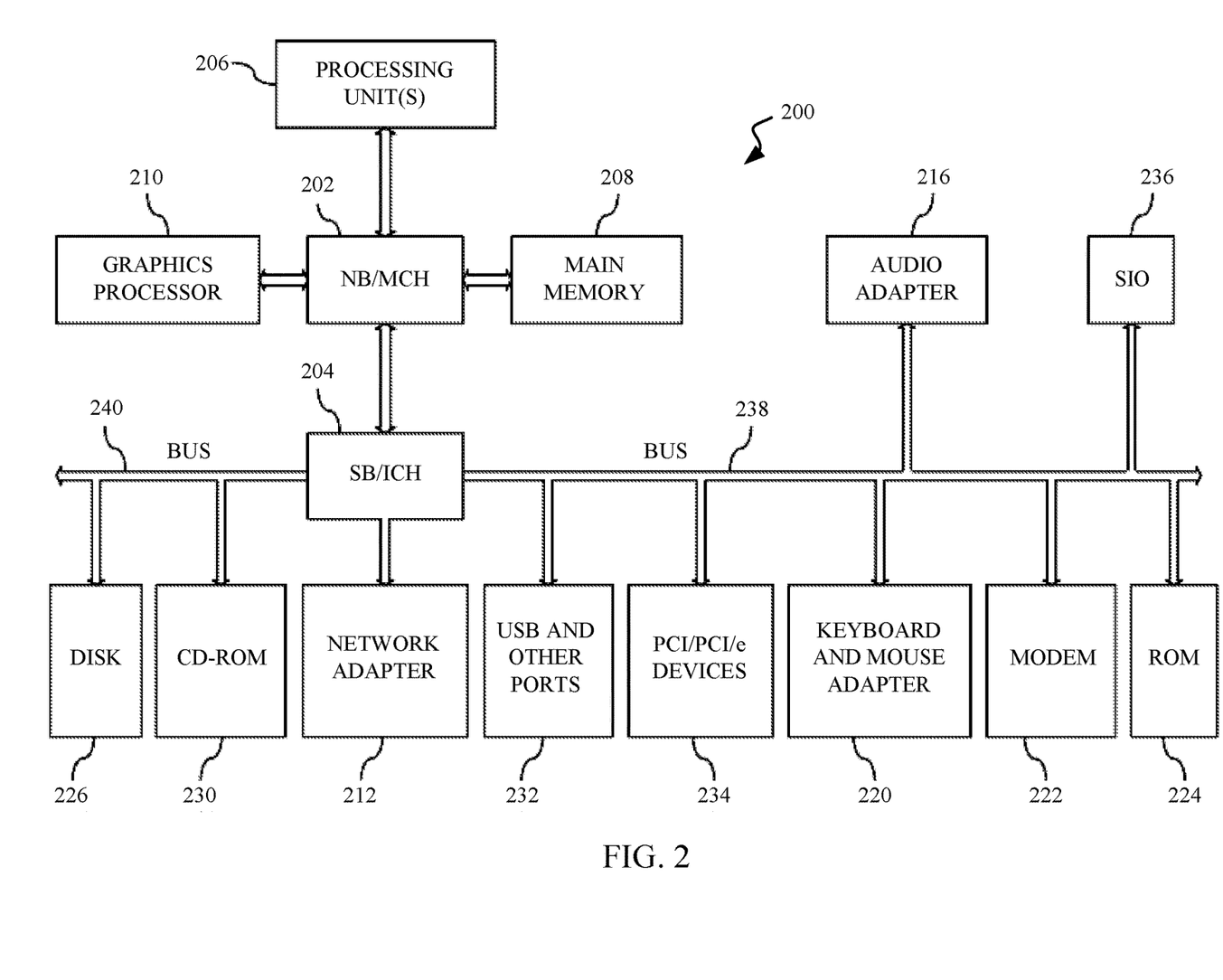
FIG. 2 is a block diagram depicting an example computing system, according to embodiments consistent with the figures.

FIG. 2 is a block diagram of an example system 200 in which aspects of the illustrative embodiments may be implemented. The system 200 is an example of a computer, such as client 110, FIG. 1, in which computer-usable code or instructions implementing the processes for illustrative embodiments of the present disclosure may be located.

In the depicted example, the system 200 employs a hub architecture including a north bridge and memory controller hub (NB/MCH) 202 and a south bridge and input/output (I/O) controller hub (SB/ICH) 204. One or more processing unit(s) 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices 234 may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object oriented programming system, such as the Java™ programming system, may run in conjunction with the operating system and provides calls to the operating system from Java™ programs or applications executing on system 200.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. In some embodiments, a single processor system may be employed.

Instructions for the operating system, the programming system, and applications or programs are located on storage devices, such as HDD 226, and may be loaded into main memory 208 for execution by processing unit 206. Similarly, one or more message processing programs according to embodiments may be adapted to be stored by the storage devices and/or the main memory 208.

The processes for illustrative embodiments of the present disclosure may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may include one or more buses. The bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present disclosure.

Moreover, the system 200 may take the form of any of a number of different data processing systems including client computing devices, server computing devices, a tablet computer, laptop computer, telephone or other communication device, a personal digital assistant (PDA), or the like. In some examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
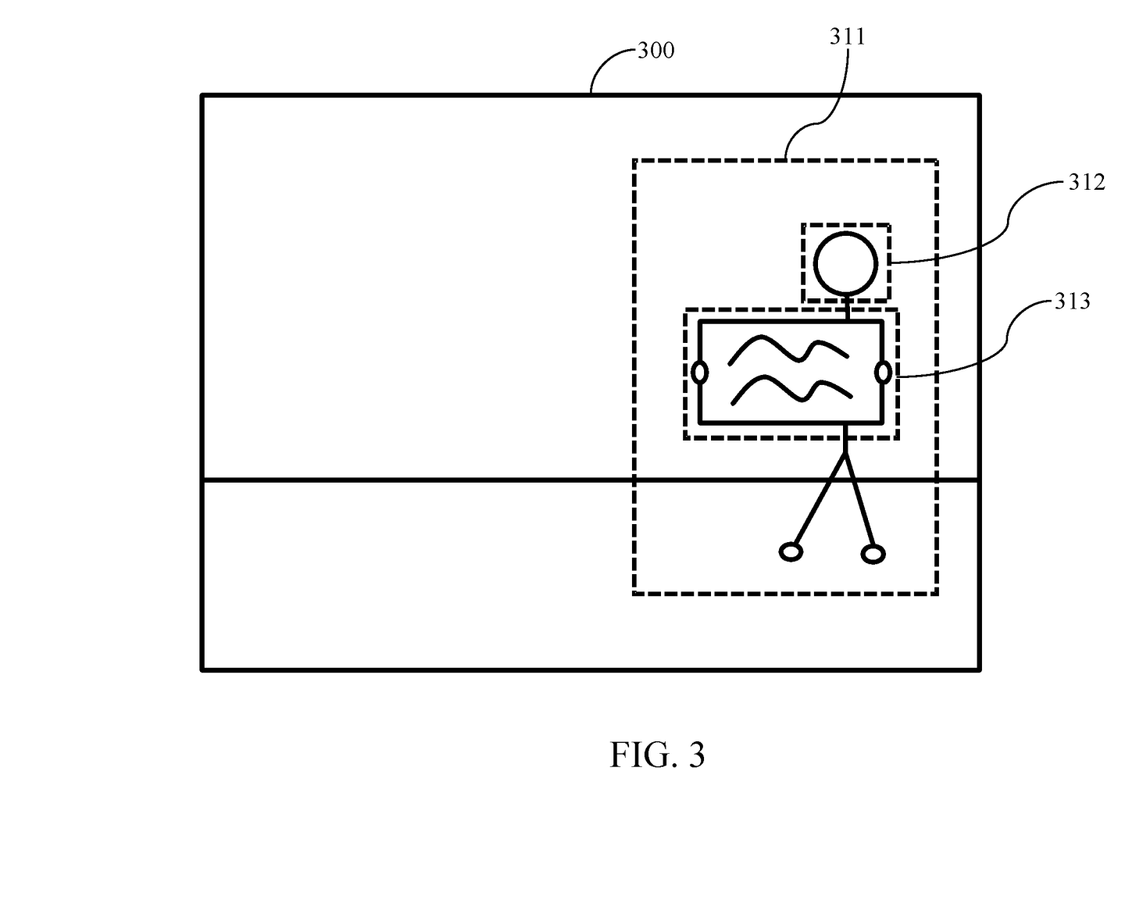
FIG. 3 depicts a digital image for watermarking by a computer-implemented method, according to embodiments consistent with the figures.

FIG. 3 depicts a digital image 300 for watermarking by a method/system according to embodiments. Embodiments can be adapted to perform an image analysis process on the digital image 300 to identify an area 311, 312 or 313 of the digital image 300 containing at least one predetermined object. In some embodiments, the image analysis process can be adapted to identify the presence and location of at least one predetermined object contained in the digital image, e.g., using an object detection process, to thereby identify an area containing the at least one predetermined object.

Methods of performing object detection will be well known to the skilled person, and typically include performing a deep learning or machine learning model on a digital image in an attempt to identify the presence of a predetermined object. Such deep learning or machine learning models are typically trained using example digital images for which a location and/or presence of an instance of a predetermined object is known, e.g., as verified by a human, where the model is iteratively modified to improve a recognition or detection of the predetermined object in the example digital images. However, other methods of detecting the presence and location of a predetermined object in a digital image will be readily apparent to one skilled in the art.

In particular, an image analysis process may detect the presence of a predetermined object, and identify a location of the predetermined object. An area containing the at least one predetermined object can thereby be identified. The size and location or bounds of the identified area may be defined by the predetermined object. By way of example, the area identified by the image analysis process may be an area that demarcates the predetermined object within the digital image. In other examples, the identified area has a width based on, e.g., equal to or no less than, the maximum width of the object and a height based on, e.g., equal to or no less than, the maximum height of the object. Other methods of identifying an area containing a predetermined object will be readily apparent to the skilled person. It will be understood that the size of the identified area is less than the size of the overall digital image.

The predetermined object may include, for example, an object displaying cognitive information, such as a screen, billboard or advertisement, a human figure, a human face, text, signage, flags, and so on. Such objects have been identified as being particularly vulnerable or susceptible to editing by an unauthorized user, so that it would be particularly advantageous to discourage editing of such objects and/or enable editing of these objects to be immediately recognized in an edited image. Preferably, the predetermined object is one displaying cognitive information understandable by a viewer of the digital image. The predetermined object may be an aesthetic creation, i.e., not created naturally or created by a human hand/mind.

The predetermined object can be one which, if edited, could mislead a viewer of the edited image as to an original intent or message of the digital picture. For example, a human face could be edited from happy to sad, misleading a viewer with the edited image. In another example, text on a sign held by a person could be edited to mislead a viewer of the edited image as to the intent or allegiance of the person holding the sign. Where the predetermined object is signage or text, an image analysis operation may include identifying an area having a uniform background or color with symbols and/or text disposed therein. This enables easily editable text or signage to be readily identified.

In a first example, the image analysis process is adapted to identify a human figure in the digital image 300. In other words, in the first example, the at least one predetermined object includes a human figure. A first area 311 containing the human figure can thereby be identified. In a second example, the image analysis process is adapted to identify a human face in the digital image 300, so that the at least one predetermined object includes a human face. In this way, a second area 312 containing, as the at least one predetermined object, a human face can be identified.

In a third example, the image analysis process is adapted to identify signage in this digital image 300, so that the at least one predetermined object includes signage. The image analysis process may, for example, be adapted to identify uniform shapes or polygons in the digital image, as such shapes are typically indicative of a sign. Other methods of detecting signage will be readily apparent to the skilled person, e.g., using machine learning models. In this way a second area 312 containing, as the at least one predetermined object, signage can be identified.

Alternatively, the image analysis process may be adapted to identify text in the digital image 300, so that the predetermined object is text. Text-identifying techniques are well known in the art. The same third area 313 can be identified in this alternative scenario, i.e., as the signage includes or is formed of text. In embodiments, the signage can include other symbols or cognitive information, such as a road sign, and image analysis methods may be adjusted accordingly. From the foregoing, it is clear that an image analysis process may be applied to a digital image 300 in order to identify an area 311, 312 or 313 containing a predetermined object, such as a human figure, a human face or signage/text.

Figure 4:
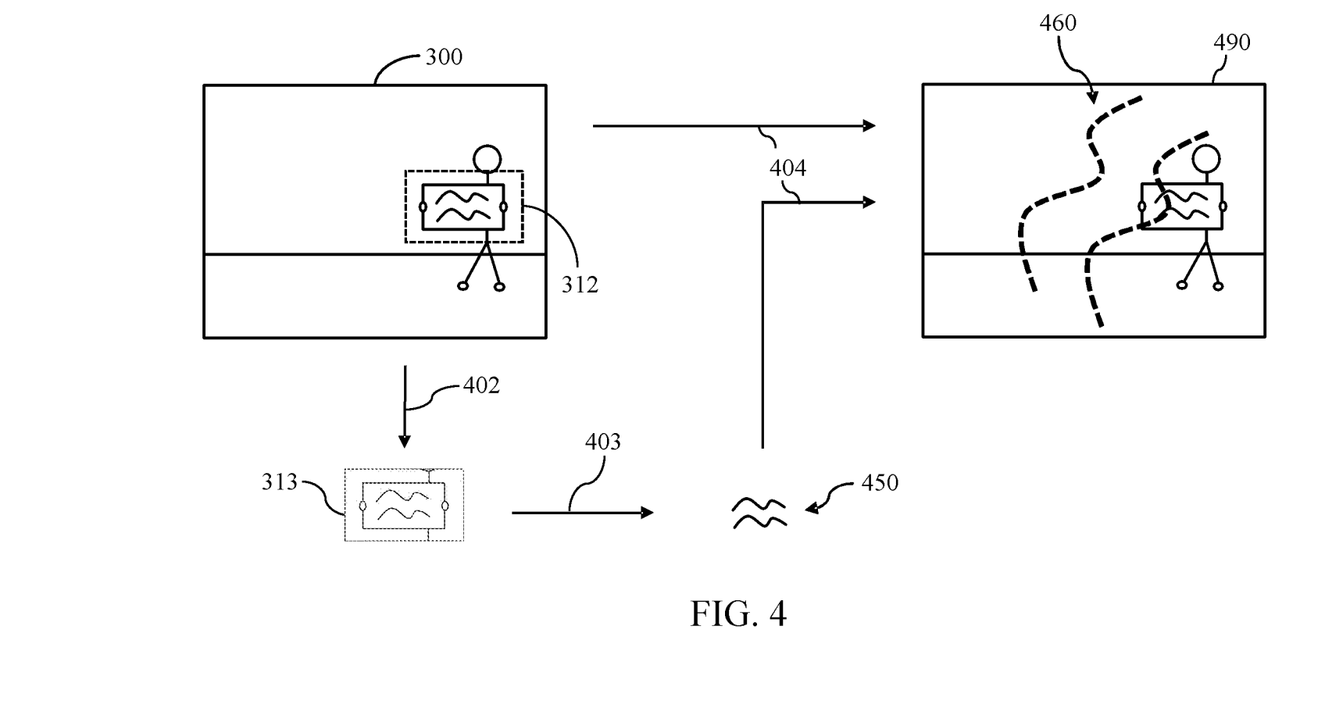
FIG. 4 depicts a computer-implemented method of watermarking the digital image, according to embodiments consistent with the figures.

FIG. 4 depicts a method for watermarking the digital image 300 according to embodiments. As previously described, the method includes an operation 402 of identifying a third area 313 of the digital image 300 containing a predetermined object, e.g., signage or text. The method also includes an operation 403 of generating watermark information 450 based on a content of the third area 313.

Numerous embodiments are contemplated for the operation 403. In the depicted example, operation 403 includes performing an optical character recognition process on the third area 313 to obtain machine-encoded text or a string, representative of the text displayed in the identified third area 313. Watermark information 450 can then be generated containing the machine-encoded text or string.

In another example, operation 403 includes generating an image hash of the identified area, the image hash forming watermark information. In yet another example, operation 403 includes identifying an object contained in the predetermined area, e.g., identifying a human contained in a predetermined area, and generating watermark information, such as a string, representative of an identity of the object. In yet another example, operation 403 includes identifying cognitive information displayed by an object contained in an identified area, and generating watermark information representative of the cognitive information displayed, such as a string indicating the cognitive information. In another example, operation 403 includes identifying a symbol or symbols displayed by an object contained in the identified area, and generating watermark information representative of the symbol(s) identified, such as a string containing the symbols or a computer-generated descriptor of the symbols. In yet another example operation 403 simply includes obtaining the entirety of the identified area 312 as watermark information, e.g., the watermark information includes a cropped image formed of the identified third area 313.

The process performed in operation 403 may, for example, depend upon the type of predetermined object contained in the third area 313. In one example, if the predetermined object includes text, operation 402 may include performing an optical character recognition (OCR) process to obtain machine-encoded text for the watermark information. In another example, if the predetermined object includes a human face, operation 403 may include identifying the human face, e.g., determining a name of the person having the face, to obtain identifying information for the watermark information. In this way, operation 403 includes generating watermark information representative of the content of the identified area and representative of the object contained in the identified area, e.g., representative of the at least one predetermined object contained in the identified area.

Operation 403 can include deriving or determining cognitive information, such as text, symbols or identifiers, displayed in the identified third area 313 of digital image 300 and generating watermark information representative of the cognitive information, such as a string including the cognitive information.

The method then includes an operation 404 of applying a digital watermark 460 to the digital image 300, thereby generating a watermarked digital image 490. The applied digital watermark 460 contains the generated watermark information 450. By way of example, the applied digital watermark 460 may be a visible or human-perceptible digital watermark that is superimposed over the digital image 300 containing watermark information 450.

The visible digital watermark 460 may be partially transparent, e.g., having an opacity of between 10% and 90%, such as between 40% and 60%, so that the entire content of the original digital image 300 remains visible, whilst still showing the digital watermark 460 to a viewer of the watermarked digital image 490. In the depicted example, the watermark information 450 includes machine-encoded text, so that the applied digital watermark 460 is formed of text superimposed over the digital image 300.

In some embodiments, where operation 403 includes performing an optical character recognition process on the third area 313, operation 403 can also include identifying typeface characteristics of the identified text. These typeface characteristics can be employed in operation 404 so that the superimposed digital watermark has the same typeface characteristics as the identified text. In some embodiments, the digital watermark is at least partially superimposed over the area identified as containing the at least one predetermined object. This helps dissuade editing of the identified area and the object contained in the identified area, or enables editing of this area to be readily identified by a viewer of the (edited) watermarked digital image 490.

In some embodiments, the digital image 300 can be a picture of a first user holding a sign saying "I love puppies." The method may process the digital image, identify that the digital image contains a sign, i.e., as a predetermined object, perform text recognition on the sign to obtain watermark information "I love puppies" and create a digital watermark that is placed over the top of the entire digital image containing the watermark information. In this way, a digital watermark formed of the text "I love puppies" is superimposed over the digital image. In the example implementation, if a subsequent, second user tries to modify the sign of the watermarked image to say something else, such as "I don't like puppies," other users who view such a modified image will be able to see that the text on the sign doesn't match the watermark and is therefore not representative of the true text of the original digital image, and therefore the intention of the first user. Thus, there is a reduced likelihood that modifications to a digital image to disrupt the original intent or message of the image will go unnoticed. In some embodiments, the digital watermark may be an invisible or non-perceptible watermark, which allows additional information about the image to be stored, whilst still allowing for automated detection of editing to take place.

Figure 5:
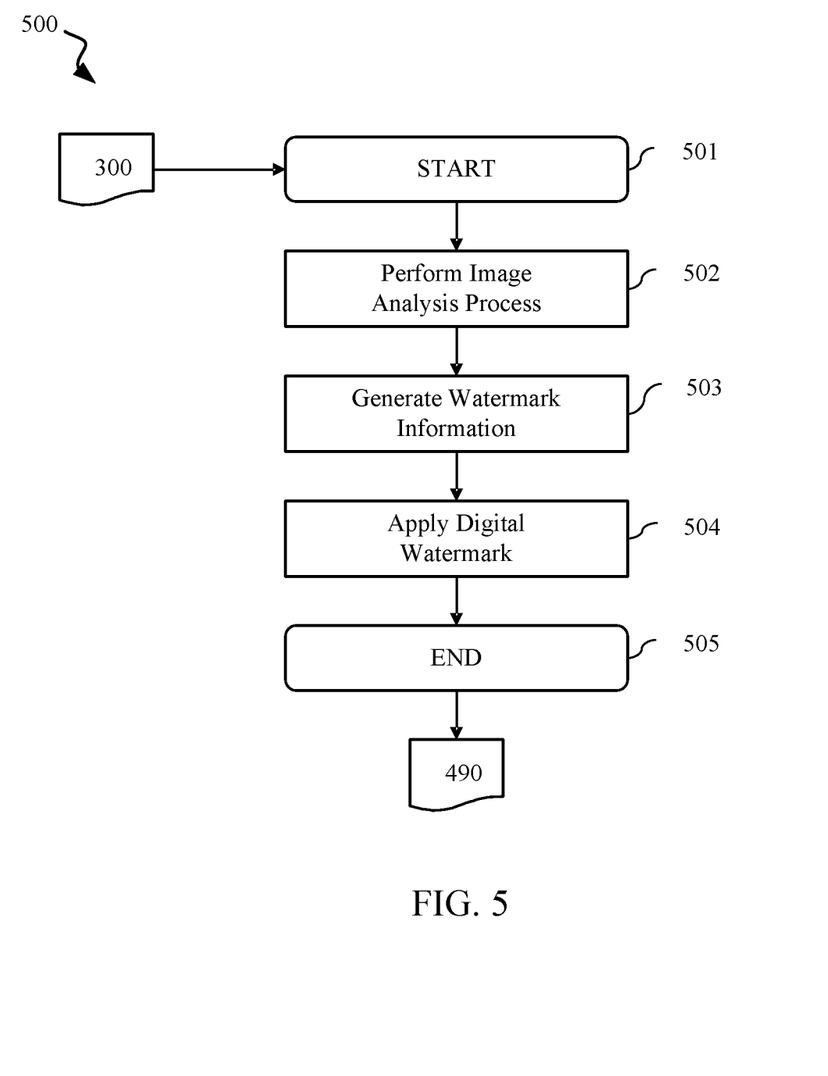
FIG. 5 is a flow diagram depicting the computer-implemented method for watermarking the digital image, according to embodiments consistent with the figures.

FIG. 5 depicts a flow diagram of a method 500 for watermarking a digital image 300 including the operations previously described. The method 500 begins at START 501. In the operation 501, the method may include obtaining a digital image 300 for watermarking. Operation 501 may be initiated, for example, when a user uploads a digital image to social media, which image can then be automatically processed using the proposed method. In another example, operation 501 may be initiated when a picture is taken for example, on a cellular phone or digital camera.

The method 500 then moves to operation 502 of performing an image analysis process on the digital image to identify an area of the digital image containing at least one predetermined object.

The method 500 then moves to operation 503 of generating watermark information representative of the content of the identified area.

The method 500 then moves to operation 504 of applying a digital watermark to the digital image, the applied digital watermark containing the generated watermark information.

The applied digital watermark may be a visible digital watermark which, preferably at least partially overlaps the area identified in operation 502. The position, size, orientation and/or opacity of the watermark can be calculated from user preferences and/or from the context of the digital image, such as the size of the digital image, the number and/or position of objects in the digital image and/or brightness/darkness of the digital image.

In particular, the digital watermark may be positioned so as to overlap the identified object and/or identified area of the image. This increases a security of the watermark, as it is more difficult to edit the identified object due to the presence of the watermark. In some embodiments, the opacity/size/position of the watermark may depend upon the type of predetermined object identified, e.g., signs and billboards may be associated with watermarks of different opacities. This increases the chances of the digital watermark being recognized by a viewer.

In some embodiments, the digital image may be analyzed to identify a section of the digital image where there is significant deviance in colors/shade, e.g., a patterned section of the image, i.e., a "complex section." The digital watermark may be positioned to overlay such a section. This increases a security of the digital watermark by increasing a difficulty of editing the digital watermark, as it would be more difficult to modify a watermark overlaying such a complex section.

In some embodiments, the digital image may be analyzed to identify other areas containing other objects, i.e., areas/objects not associated with the digital watermark. The digital watermark may be positioned so as to not overlap or avoid overlap with such other areas of other objects, in order to reduce the distortion to the picture.

The method 500 ends at operation 505. The watermarked digital image 490 may thereby be output. In an example, where a digital image is uploaded to a social media platform, operation 505 may include uploading, storing, saving, and/or transmitting the watermarked digital image 490.

As previously described, preferably the image analysis process performed in operation 502 includes an object detection process adapted to identify at least one predetermined object contained in the digital image. Thus, operation 502 may include identifying a location of at least one predetermined object.

The at least one predetermined object identified in operation 502 can be an object providing cognitive, and preferably human designed, information to a viewer of the digital image, such as signage, billboards, placards, advertisements, text, logos, paintings, screens, visual displays, and so on.

Cognitive information can include information that provides a message or understanding to a viewer of the image, such as an understanding of an allegiance, message or viewpoint of a human providing the cognitive information, e.g., via a sign, placard, flag, and so on. In some embodiments, the opacity of the digital watermark can be set manually, e.g., user preferences, or can be a value calculated based on a user's input indicating their desire for balance of protection against future change against how much the user wishes the picture to be modified by the watermark. In general, the greater the opacity, the greater the protection against future modification to the image.

The method 500 may be iteratively repeated for each of a plurality of digital images. For example, the method 500 may be repeated for each image contained within an album uploaded to a social media platform. In another example the method 500 may be repeated for each image of a selected list of images to be processed, e.g., on a digital camera, cellular phone, or computer system.

According to embodiments, the above-described methods may be adapted for use in watermarking a digital video. Thus, reference to a digital image can be understood as referring to a frame of a digital video. In some embodiments, the proposed method can therefore be repeated for each frame of a digital video. In another example, the method may be adapted to detect the presence of a predetermined object in the digital video, and duration for which that predetermined object is present in the video. An appropriate digital watermark, representative of the content of an area containing the predetermined object in the video, may be applied to the digital video for the duration that the predetermined object is present in the video.

Figure 6:
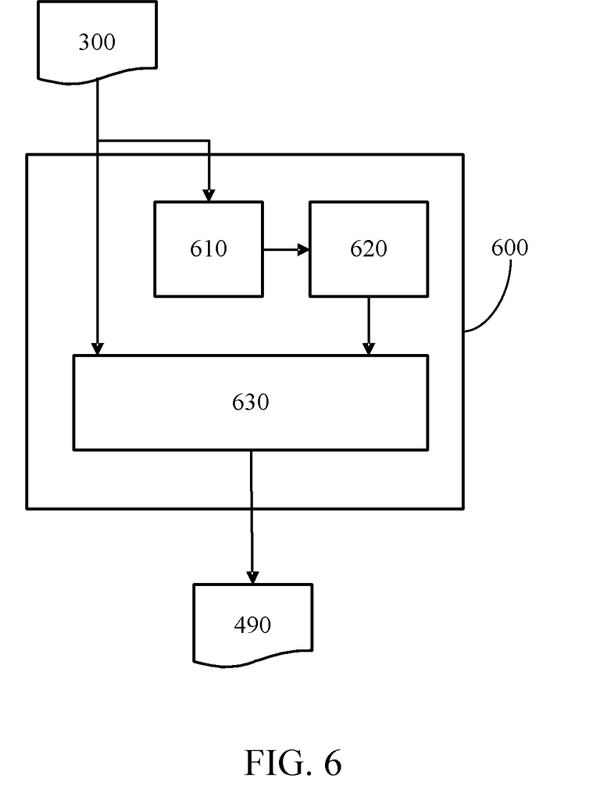
FIG. 6 is a block diagram depicting a system for watermarking a digital image, according to embodiments consistent with the figures.

FIG. 6 depicts a system 600 for watermarking a digital image 300 according to embodiments. Such a system may, for example, be employed in a processor, digital camera, cellular phone or computer system.

The system 600 includes an image analyzer 610 adapted to perform an image analysis process on the digital image to identify an area of the digital image containing at least one predetermined object. The system 600 also includes a watermark generator 620 adapted to generate watermark information representative of the content of the at least one identified area. The system 600 also includes a watermark applicator 630 adapted to apply a digital watermark to the digital image, the applied digital watermark containing the watermark information. The system 600 thereby outputs a watermarked digital image 490.

Figure 7:
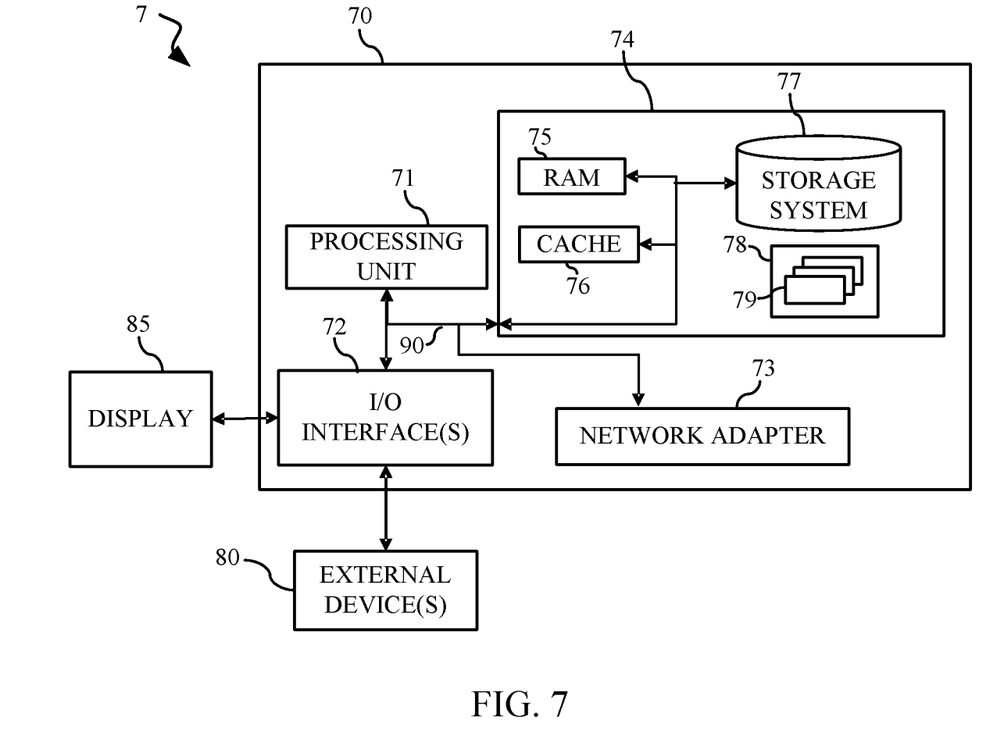
FIG. 7 is a block diagram depicting a computing system in which aspects of the illustrative embodiments may be implemented, according to embodiments consistent with the figures.

By way of further example, as depicted in FIG. 7, embodiments may include a computer system/server 70, which may form part of a networked system 7. The components of computer system/server 70 may include, but are not limited to, one or more processing arrangements, for example including processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 can includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 77 can be provided for reading from and writing to a non-removable, non-volatile magnetic media, not shown and typically called a "hard drive". Although not shown, a magnetic disk drive for reading from and writing to a removable, non-volatile magnetic disk, e.g., a "floppy disk", and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set, e.g., at least one, of program modules that are configured to carry out the functions of embodiments of the disclosure.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the disclosure as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present disclosure constitute a method, it should be understood that such a method is a process for execution by a computer, i.e., is a computer-implementable method. The various operations of the method therefore reflect various parts of a computer program, e.g., various parts of one or more algorithms.

The present disclosure may be a system, a method, and/or a computer program product at any possible technical detail level of integration. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media, e.g., light pulses passing through a fiber-optic cable, or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flow diagram illustrations and/or block diagrams of methods, apparatus (systems), and computer program products according to embodiments of the disclosure. It will be understood that each block of the flow diagram illustrations and/or block diagrams, and combinations of blocks in the flow diagram illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flow diagram and/or block diagram block or blocks.

The computer-readable program instructions may also be loaded onto a computer, other programmable data processing apparatus, or other device to cause a series of operational operations to be performed on the computer, other programmable apparatus or other device to produce a computer-implemented process, such that the instructions which execute on the computer, other programmable apparatus, or other device implement the functions/acts specified in the flow diagram and/or block diagram block or blocks.

The flow diagram and block diagrams in the Figures depict the architecture, functionality, and operation of possible implementations of systems, methods, and computer program products according to various embodiments of the present disclosure. In this regard, each block in the flow diagram or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for watermarking a digital image, the method comprising:
   performing, on the digital image, an image analysis process to identify an area of the digital image containing at least one predetermined object that includes text;
   generating watermark information representative of content of the identified area, the generating including:
      obtaining machine-encoded text by performing, on the identified area of the digital image containing the text, an optical character recognition process; and
      generating watermark information containing the machine-encoded text; and
   applying, to the digital image, a digital watermark containing the generated watermark information.

2. The method of claim 1, wherein the image analysis process includes an object detection process adapted to identify, within the digital image, the at least one predetermined object.

3. The method of claim 2, wherein generating watermark information is based on the at least one predetermined object identified within the digital image.

4. The method of claim 1, wherein applying a digital watermark to the digital image includes superimposing a visible watermark on the digital image.

5. The method of claim 1, wherein the at least one predetermined object includes at least one object displaying cognitive information, and wherein the image analysis process is adapted to identify an area of the digital image containing the at least one object displaying cognitive information.

6. The method of claim 1, wherein applying the digital watermark includes superimposing the machine-encoded text onto the digital image.

7. The method of claim 1, further comprising identifying typeface characteristics of the text within the at least one predetermined object, and wherein the generating watermark information includes generating a digital watermark including the machine-encoded text that has typeface characteristics consistent with the identified typeface characteristics of the text within the at least one predetermined object.

8. The method of claim 1, wherein the at least one predetermined object includes signage, and wherein the image analysis process is adapted to identify an area of the image containing the signage.

9. The method of claim 8, wherein generating watermark information includes:
   identifying, by performing a signage processing operation on the identified area of the digital image containing signage, cognitive information provided by the signage; and generating watermark information that includes the cognitive information provided by the signage.

10. A computer program product for watermarking a digital image, the computer program product comprising a computer-readable storage medium having program instructions embodied therewith, wherein the computer-readable storage medium is not a transitory signal per se, the program instructions executable by a computer to cause the computer to perform a method comprising:
- performing, on the digital image, an image analysis process to identify an area of the digital image containing at least one predetermined object that includes text;
- generating watermark information representative of content of the identified area, the generating including:
  - obtaining machine-encoded text by performing, on the identified area of the digital image containing the text, an optical character recognition process; and
  - generating watermark information containing the machine-encoded text; and
- applying, to the digital image, a digital watermark containing the generated watermark information.

11. The computer program product of claim 10, wherein the image analysis process includes an object detection process adapted to identify, within the digital image, the at least one predetermined object.

12. The computer program product of claim 11, wherein generating watermark information is based on the at least one predetermined object identified within the digital image.

13. The computer program product of claim 10, wherein applying a digital watermark to the digital image includes superimposing a visible watermark on the digital image.

14. The computer program product of claim 10, wherein the at least one predetermined object includes at least one object displaying cognitive information, and wherein the image analysis process is adapted to identify an area of the digital image containing the at least one object displaying cognitive information.

15. A system for watermarking a digital image, the system comprising:
- at least one processor circuit;
- a memory electrically coupled to the at least one processor circuit;
- a set of computer program instructions stored in the memory and executed by the at least one processor circuit in order to perform a method comprising:
  - performing, on the digital image, an image analysis process to identify an area of the digital image containing at least one predetermined object that includes text;
- generating watermark information representative of content of the identified area, the generating including:
  - obtaining machine-encoded text by performing, on the identified area of the digital image containing the text, an optical character recognition process; and
  - generating watermark information containing the machine-encoded text; and
- applying, to the digital image, a digital watermark containing the generated watermark information.

16. The system of claim 15, wherein applying the digital watermark includes superimposing the machine-encoded text onto the digital image.

* * * * *